US008111609B2

(12) United States Patent
Wei et al.

(10) Patent No.: US 8,111,609 B2
(45) Date of Patent: Feb. 7, 2012

(54) MAPPING RESOURCE BLOCKS INTO SUBCHANNELS

(75) Inventors: Chao Wei, Beijing (CN); Xin Qi, Beijing (CN); Shaohua Li, Beijing (CN)

(73) Assignee: Nokia Siemens Networks Oy, Espoo (FI)

(*) Notice: Subject to any disclaimer, the term of this patent is extended or adjusted under 35 U.S.C. 154(b) by 285 days.

(21) Appl. No.: 12/428,440

(22) Filed: Apr. 22, 2009

(65) Prior Publication Data

US 2009/0262696 A1    Oct. 22, 2009

Related U.S. Application Data

(60) Provisional application No. 61/046,854, filed on Apr. 22, 2008.

(51) Int. Cl.
*H04W 72/04* (2009.01)
(52) U.S. Cl. .................... 370/208; 370/328
(58) Field of Classification Search .............. 370/328, 370/208; 455/501; 375/267
See application file for complete search history.

(56) References Cited

U.S. PATENT DOCUMENTS

| 7,224,741 | B1 | 5/2007 | Hadad | |
|---|---|---|---|---|
| 2002/0114270 | A1* | 8/2002 | Pierzga et al. | 370/208 |
| 2007/0211813 | A1* | 9/2007 | Talwar et al. | 375/267 |
| 2009/0122901 | A1* | 5/2009 | Choi et al. | 375/267 |
| 2009/0207785 | A1* | 8/2009 | Smith et al. | 370/328 |
| 2009/0264142 | A1* | 10/2009 | Sankar et al. | 455/501 |

OTHER PUBLICATIONS

"Part 16: Air Interface for Broadband Wireless Access Systems", Draft Standard for Local and Metropolitan Area Networks, P802.15Rev2/D3, IEEE WirelessMan 802.16, IEEE Computer Society and the IEEE Microwave Theory and Techniques Society, Feb. 2008, 1880 pages.
Cudak, Mark "IEEE 802.16m System Requirements", IEEE 802.16 Broadband Wireless Access Working Group <http://ieee802.org/16>, (Oct. 19, 2007),26 pgs.
Pkim, Taeyoung "Design of Resource Allocation Unit Structure for IEEE 802.16m", IEEE 802.16 Presentation Submission Template (Rev. 9), IEEE C802.16m-08/188, (Mar. 10, 2008),1-19.
Lomnitz, Yuval "Symbol Structure Design for 802.16m—Resource Blocks and Pilots", IEE 802.16 Broadband Wireless Access Working Group, IEEE C802.16m-09/121r1, (Mar. 11, 2008),1-6.

\* cited by examiner

*Primary Examiner* — Kwang B Yao
*Assistant Examiner* — Syed M Bokhari
(74) *Attorney, Agent, or Firm* — Brake Hughes Bellermann LLP (57) ABSTRACT

According to an example embodiment, a method may include determining, by a first wireless node in a wireless network, a number N of resource blocks available for transmitting data within a cell, the N resource blocks each including V resource block orthogonal frequency division multiplexing (OFDM) symbols, the V resource block OFDM symbols each including U resource block subcarriers. The method may also include mapping the N resource blocks into N subchannels based on a permutation formula, the permutation formula assigning, based on permutation parameters including the number N and a random or pseudorandom variable, U subchannel subcarriers for each of V subchannel OFDM symbols to each of the N subchannels and thereby allocating a subchannel index for each of the N subchannels. The method may also include sending a message to a second wireless node indicating the permutation parameters and the allocated subchannel index of at least one of the N subchannels for communication between the first wireless node and the second wireless node.

25 Claims, 6 Drawing Sheets

MAPPING RESOURCE BLOCKS INTO SUBCHANNELS

PRIORITY CLAIM

This application claims the benefit of priority based on U.S. Provisional Patent Application No. 61/046,854, filed on Apr. 22, 2008, entitled, "Mapping Resource Blocks Into Subchannels," the disclosure of which is hereby incorporated by reference.

TECHNICAL FIELD

This description relates to wireless networks.

BACKGROUND

In a wireless network, spectral resources may be limited. Spectral resources may be allocated in resource blocks which each include a specified frequency range. In a communication system which uses orthogonal frequency division multiplexing (OFDM), the resource blocks may be divided into a plurality of subcarriers.

SUMMARY

According to an example embodiment, a method may include determining, by a first wireless node in a wireless network, a number N of resource blocks available for transmitting data within a cell, the N resource blocks each including V resource block orthogonal frequency division multiplexing (OFDM) symbols, the V resource block OFDM symbols each including U resource block subcarriers. The method may also include mapping the N resource blocks into N subchannels based on a permutation formula, the permutation formula assigning, based on permutation parameters including the number N and a random or pseudorandom variable, U subchannel subcarriers for each of V subchannel OFDM symbols to each of the N subchannels and thereby allocating a subchannel index for each of the N subchannels. The method may also include sending a message to a second wireless node indicating the permutation parameters and the allocated subchannel index of at least one of the N subchannels for communication between the first wireless node and the second wireless node.

According to another example embodiment, an apparatus may include a controller and a wireless transceiver coupled to the controller. The controller may be configured to determine a number N of resource blocks available for transmitting data within a cell, the N resource blocks each including V resource block orthogonal frequency division multiplexing (OFDM) symbols, the V resource block OFDM symbols each including U resource block subcarriers. The controller may be further configured to map the N resource blocks into N subchannels based on a permutation formula, the permutation formula assigning, based on permutation parameters including the number N and a random or pseudorandom variable, U subchannel subcarriers for each of V subchannel OFDM symbols to each of the N subchannels and thereby allocating a subchannel index for each of the N subchannels. The controller may be further configured to generate a message for a receiving wireless node indicating the permutation parameters N and the random or pseudorandom number, and the allocated subchannel index of at least one of the N subchannels for communication between the apparatus and the receiving wireless node. The wireless transceiver may be configured to wirelessly transmit the message to the receiving wireless node.

According to another example embodiment, a computer program product for mapping resource blocks into subchannels may be tangibly embodied on a computer-readable medium and include executable code that, when executed, is configured to cause a base station which wirelessly communicates with a plurality of mobile stations to: determine, by the base station, a number N of resource blocks available for transmitting data within a cell, the N resource blocks each including V resource block orthogonal frequency division multiplexing (OFDM) symbols, the V resource block OFDM symbols each including U resource block subcarriers; map the N resource blocks into N subchannels based on a permutation formula, the permutation formula assigning, based on permutation parameters including the number N and a random or pseudorandom variable, U subchannel subcarriers for each of V subchannel OFDM symbols to each of the N subchannels and thereby allocating a subchannel index for each of the N subchannels; and send a message to at least one of the plurality of mobile stations indicating the permutation parameters N and the random or pseudorandom number and the allocated subchannel index of at least one of the N subchannels for communication between the base station and the at least one of the plurality of mobile stations.

The details of one or more implementations are set forth in the accompanying drawings and the description below. Other features will be apparent from the description and drawings, and from the claims.

DETAILED DESCRIPTION

Figure 1:
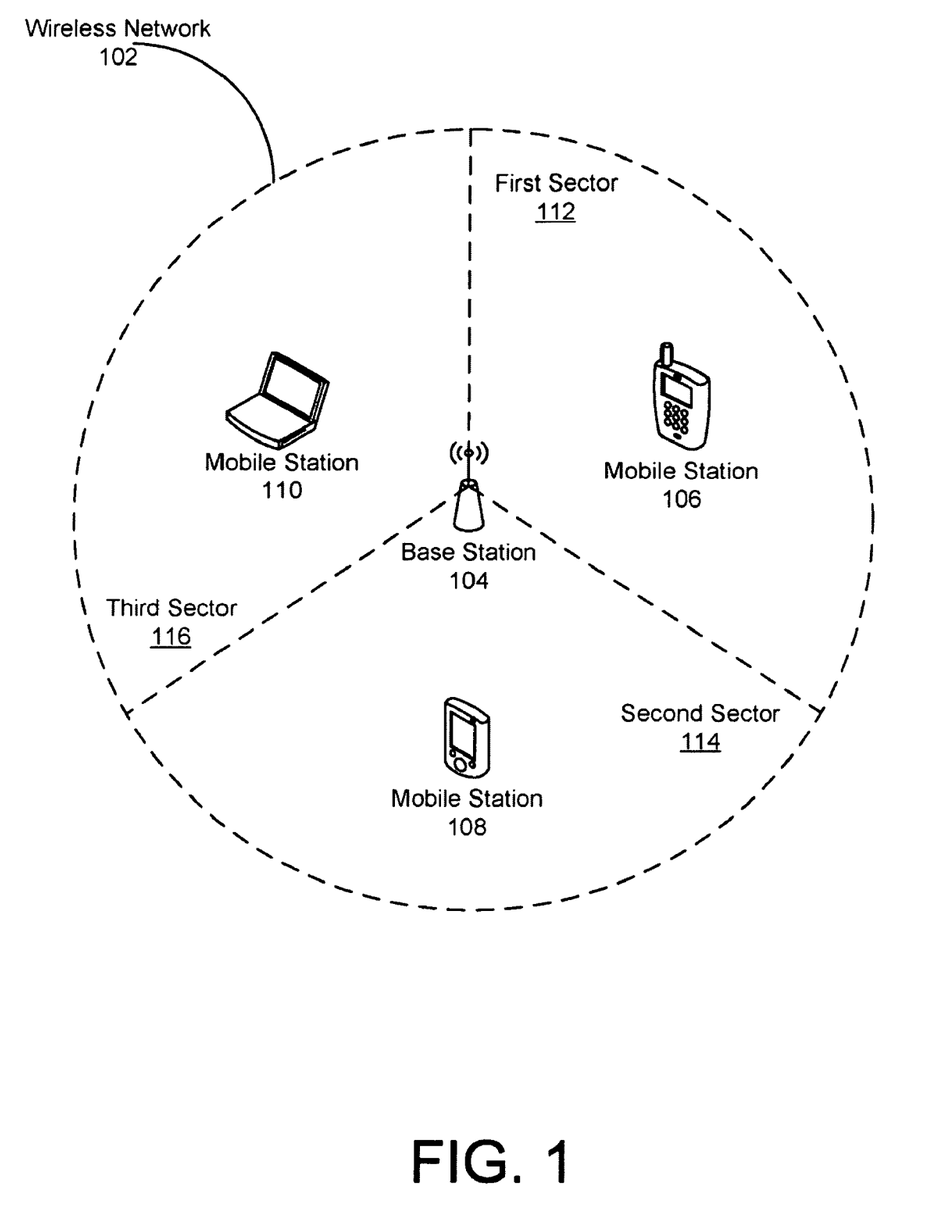
FIG. 1 is a block diagram of a wireless network according to an example embodiment.

FIG. 1 is a block diagram of a wireless network 102 according to an example embodiment. The wireless network 102 may include, for example, an IEEE 802.16 Worldwide Interoperability for Microwave Access (WiMAX) network, an IEEE 802.11 local area network (LAN), or a cellular telephone network, according to example embodiments. The wireless network 102 may be allocated and/or assigned spectral resources and/or a frequency range for communication by a network operator (not shown) or by negotiation with other wireless networks, according to example embodiments. The spectral resources, frequency ranges, and/or subcarriers assigned to the wireless network 102 may be equal to that of other wireless networks, or may be assigned based on need, such as based on the number of mobile stations 106, 108, 110 in each wireless network, the data rate of communication in each wireless network, and/or spectral resources needed to compensate for noise and/or interference in an adaptive modulation scheme, according to example embodiments.

The wireless network 102 may include a wireless node such as a base station 104. The base station 104 may include, for example, a WiMAX base station, a LAN access point (AP), a cellular base station, or a node B, according to example embodiments. The base station 104 may be configured to wirelessly communicate with other devices in the network 102. The base station 104 may also communicate via a wired or wireless medium with a network operator, a gateway (not shown), or with base stations from other wireless networks, according to example embodiments.

The base station 104 may wirelessly communicate with one or more wireless nodes such as mobile stations 106, 108, 110 in the wireless network 102. The mobile stations 106, 108, 110 may include, for example, smartphones, personal digital assistants (PDAs), laptop or notebook computers, or cellular telephones, according to example embodiments. While three mobile stations 106, 108, 110 are shown in FIG. 1, any number of mobile stations 106, 108, 110 may be included in the wireless network 102, according to various example embodiments. The base station 104 may communicate with the one or more mobile stations 106, 108, 110 using orthogonal frequency division multiplexing (OFDM), according to an example embodiment.

In an example embodiment, the spectral resources available for communication within the wireless network 102 may be available for use throughout the entire wireless network 102, with no limitations as to which spectral resources or frequencies may be used in certain parts of the wireless network 102. In another example embodiment, the wireless network 102 and/or base station 104 may utilize fractional frequency reuse (FFR). FFR involves dividing the wireless network 102 into a plurality of sectors. In the example shown in FIG. 1, the wireless network 102 is divided into a first sector 112, a second sector 114, and a third sector 116. While the example shown in FIG. 3 divides the wireless network 102 into three sectors 112, 114, 116, the wireless network 102 may be divided into any number of sectors 112, 114, 116. In an example embodiment, the base station 104 using FFR may communicate with mobile stations 106, 108, 110 in each sector 112, 114, 116 using only spectral resources, frequency ranges, and/or subcarriers assigned to that specific sector 112, 114, 116. The spectral resources, frequency ranges, and/or subcarriers assigned to each sector 112, 114, 116 may be divided equally between the sectors 112, 114, 116, or may be divided based on need, such as based on the number of mobile stations 106, 108, 110 in each sector 112, 114, 116, the data rate of communication in each sector 112, 114, 116, and/or spectral resources needed to compensate for noise and/or interference in an adaptive modulation scheme, according to example embodiments.

Figure 2:
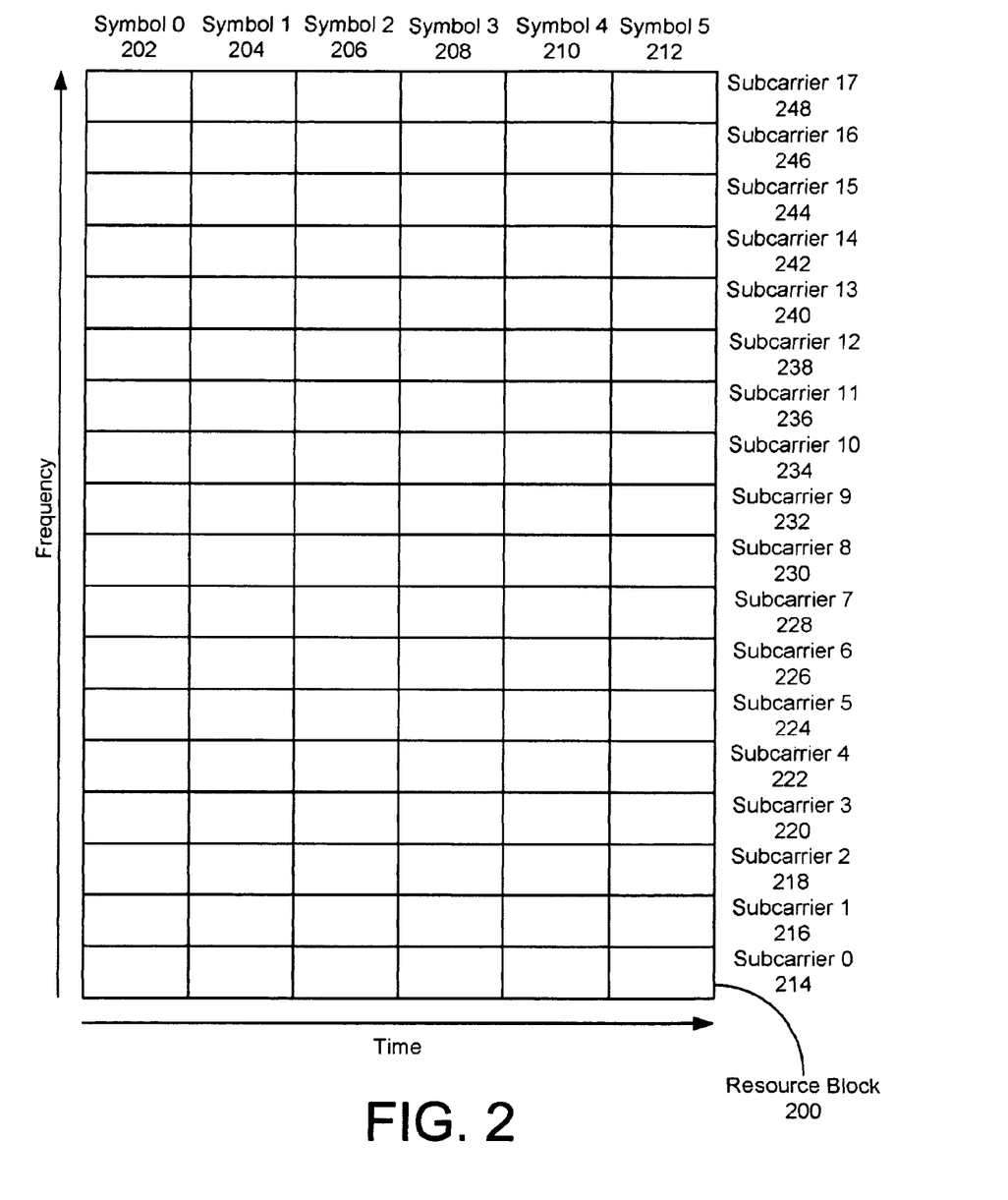
FIG. 2 is a block diagram of a resource block according to an example embodiment.

In an example embodiment, the spectral resources available for communication within the wireless network 102 may be divided into a plurality, denoted 'N', resource blocks. FIG. 2 is a block diagram of a resource block 200 according to an example embodiment. In an example in which the resource blocks 200 are used for OFDM communication, the resource block 200 may include a plurality, denoted 'V', OFDM symbols 202, 204, 206, 208, 210, 212. The V OFDM symbols 202, 204, 206, 208, 210, 212 may be sequential in time. In the example shown in FIG. 2, the resource block 200 may include six OFDM symbols 202, 204, 206, 208, 210, 212. However, any number of OFDM symbols 202, 204, 206, 208, 210, 212 may be included in the resource block 200, according to various example embodiments.

Each OFDM symbol 202, 204, 206, 208, 210, 212 may include a plurality, denoted 'U', subcarriers 214, 216, 218, 220, 222, 224, 226, 228, 230, 232, 234, 236, 238, 240, 242, 246, 248. The subcarriers 214, 216, 218, 220, 222, 224, 226, 228, 230, 232, 234, 236, 238, 240, 242, 246, 248 may each include a frequency band, such as ten kilohertz (10 kHz) via which data may be transmitted, using modulation schemes such as binary phase shift keying (BPSK), quaternary phase shift keying (QPSK), or quadrature amplitude modulation (QAM). The frequency bands of the subcarriers 214, 216, 218, 220, 222, 224, 226, 228, 230, 232, 234, 236, 238, 240, 242, 246, 248 may be contiguous in frequency. While eighteen subcarriers 214, 216, 218, 220, 222, 224, 226, 228, 230, 232, 234, 236, 238, 240, 242, 246, 248 are included in the resource block 200 shown in FIG. 2, any number may be included according to various example embodiments.

The resource blocks 200 assigned to and available to the wireless network 102 and/or each sector 112, 114, 116 may be contiguous or noncontiguous in frequency, according to example embodiments. The subcarriers 214, 216, 218, 220, 222, 224, 226, 228, 230, 232, 234, 236, 238, 240, 242, 246, 248 included in all of the resource blocks 200 assigned or allocated to the wireless network 102 and/or sector 112, 114, 116 may each be assigned an index number, such as a physical subcarrier index. The physical subcarrier index may range from 0 to (N×U)−1, according to an example embodiment. The subcarriers 214, 216, 218, 220, 222, 224, 226, 228, 230, 232, 234, 236, 238, 240, 242, 246, 248 may be assigned index numbers in ascending order according to frequency, in descending order according to frequency, or in any order, according to example embodiments.

In an example embodiment, the base station 104 may determine the number N of resource blocks 200 available for transmitting data within the wireless network 102 and/or sector 112, 114, 116, and map the N resource blocks into N subchannels. Each subchannel may, for example, include the same number of OFDM symbol 202, 204, 206, 208, 210, 212 and subcarriers 214, 216, 218, 220, 222, 224, 226, 228, 230, 232, 234, 236, 238, 240, 242, 246, 248 as the resource blocks 200. The N resource blocks 200 may, for example, be mapped into the N subchannels based on a permutation formula. The permutation formula may assign to each of the N subchannels U subcarriers for each of V OFDM symbols. The permutation formula may assign the U subcarriers for each of the V OFDM symbols to each of the N subchannels based, for example, on the number N and/or a random or pseudorandom variable. The permutation formula may also, for example, assign the U subcarriers for each of the V OFDM symbols to each of the N subchannels based on an index of the wireless network 102 and/or sector 112, 114, 116. In an example embodiment, each of the N mapped subchannels may include subcarriers 214, 216, 218, 220, 222, 224, 226, 228, 230, 232, 234, 236, 238, 240, 242, 246, 248 which may span a frequency range of the N resource blocks 200 and/or achieve greater frequency diversity than any one of the N resource blocks. This mapping may, for example achieve interference averaging between neighboring cells.

In an example in which the number N of resource blocks 200 and subchannels is greater than or equal to the number U of subcarriers 214, 216, 218, 220, 222, 224, 226, 228, 230, 232, 234, 236, 238, 240, 242, 244, 246, 248, in the first OFDM symbol for the first subchannel, the U physical tones may be chosen from the first U consecutive resource blocks 200; one tone (or subcarrier) may be selected from each resource block 200, using U resource blocks 200 for U tones. To increase the frequency diversity, the next OFDM symbols may use subcarriers or tones from the next U remaining resource blocks

200. If there are fewer than U resource blocks 200 left after the first OFDM symbol selects tones from the first U resource blocks (i.e., N<2U), then the physical tones may be selected cyclically from the first resource block 200. For each of the V OFDM symbols, the U physical tones may be selected from sequentially, and/or cyclically increasing resource blocks. In an example embodiment, the spectral resources included in the resource blocks may be mapped onto the subchannels by the following permutation formula:

$$\text{subcarrier}(k,s,m) = ((k+s+m \cdot U) \bmod N) \cdot U + (Pt[(k+m \cdot \text{PermBase}) \bmod U] + \text{Cell\_ID}) \bmod U$$

where subcarrier(k,s,m) may be a physical subcarrier index of an $m^{th}$ OFDM symbol. The subcarrier indices may be numbered sequentially in order of the resource blocks 200; in an example in which U=18 and N=20, the subcarrier indices may range from 0 to 359. s may be a subchannel index ranging from 0 to N−1, k may be a tone index ranging from 0 to U−1 in subchannel s, and m may be an OFDM symbol index ranging from 0 to V−1 in subchannel s. Pt may be a permutation sequence of length U used to achieve interference averaging, and may be a known or predetermined sequence, such as a sequence determined by a recognized standard. Cell_ID may be an ID of the wireless network 102 or sector 112, 114, 116, and may be a non-negative integer, according to an example embodiment. PermBase may be a random or pseudorandom variable, and may be selected by the base station 104 and indicated to the mobile station 104, 106, 108, according to an example embodiment. The 'mod' function may produce a remainder after dividing; for example, 5 mod 3 could equal two, 5 mod 4 could equal 1, and 5 mod 5 could equal 0.

Figure 3:
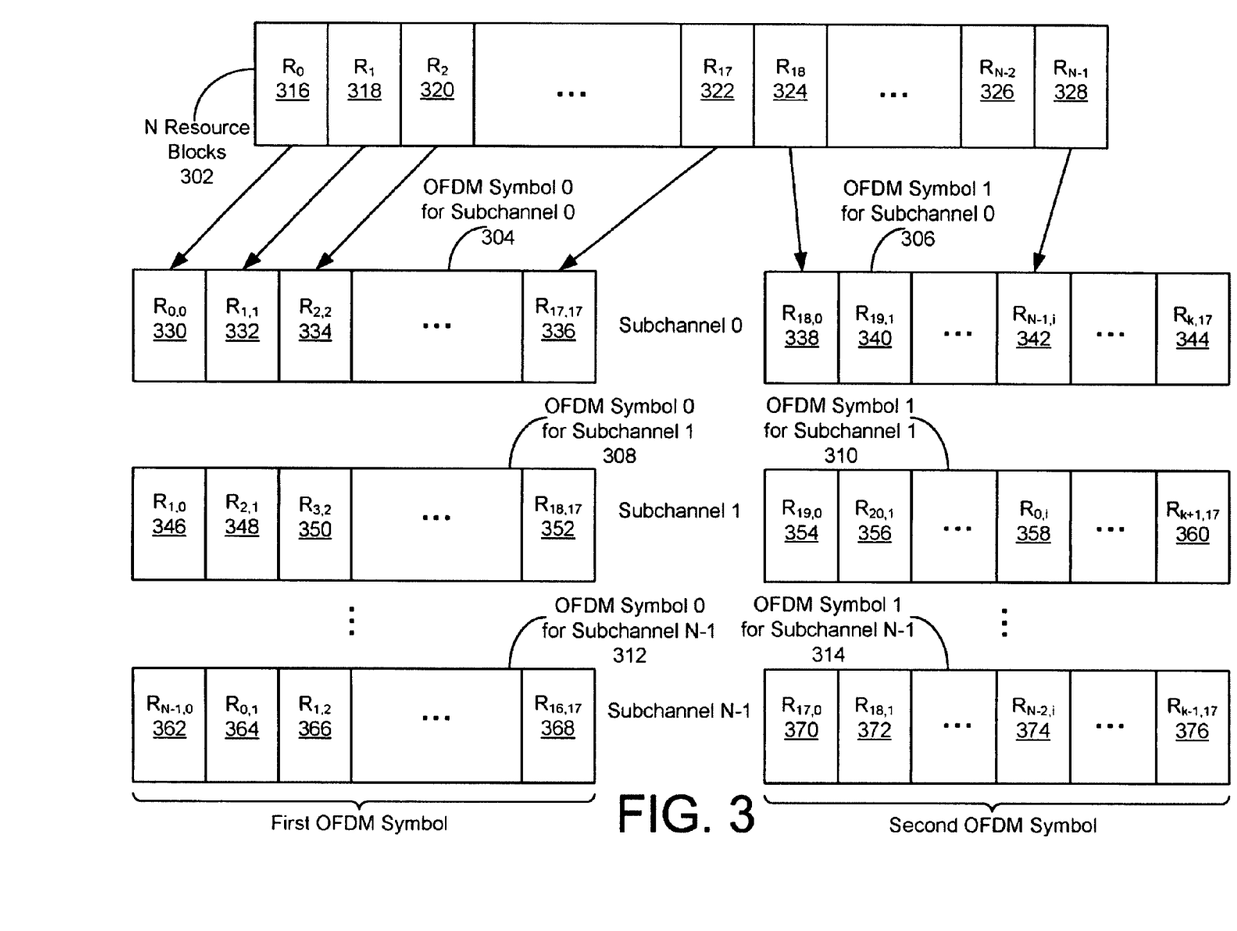
FIG. 3 is a block diagram showing assignment of subcarriers from resource blocks to subchannels according to an example embodiment.

FIG. 3 is a block diagram showing assignment of subcarriers from resource blocks to subchannels according to an example embodiment. In this example, U may be less than N. Also in this example, the first U of the N resource blocks 302 may contribute subcarriers to the OFDM symbol 0 of subchannel 0 304, and the next U of the N resource blocks 302 may contribute subcarriers to the OFDM symbol 1 of subchannel 0 306. For example, OFDM symbol 0 for subchannel 0 304 may be allocated the $0^{th}$ subcarrier or tone from the $0^{th}$ resource block 316 (shown as 0,0 in subcarrier 330), the $1^{st}$ subcarrier or tone from the $1^{st}$ resource block 318 (shown as 1, 1 in subcarrier 332), the $2^{nd}$ subcarrier or tone from the $2^{nd}$ resource block 320 (shown as 2, 2 in subcarrier 334), and so on, until the $17^{th}$ subcarrier or tone from the $17^{th}$ resource block 322 (shown as 17, 17 in subcarrier 336). Similarly, the OFDM symbol 1 for subchannel 0 may be allocated the $0^{th}$ subcarrier from the $18^{th}$ resource block 324 (shown as 18, 30 in subcarrier 338), the $1^{st}$ subcarrier from the $19^{th}$ resource block (shown 19, 1 in subcarrier 340), and so on. Other resource block and subcarrier assignments and/or allocations are shown in FIG. 3. This is merely an example. Other permutations to assign subcarriers to subchannels may be used.

In an example in which the number N of resource blocks 200 is less than the number of tones U in the subchannel, then multiple physical tones, such as L physical tones, may be chosen from each resource block 200. L may be a factor of N; in an example in which N is 100, L may be 2, 4, 5, 10, 20, 25, or 50, for example. In this example, U/L resource blocks 200 may be chosen for each subchannel. U/L may be less than N, according to an example embodiment. In an example embodiment, the spectral resources included in the resource blocks may be mapped onto the subchannels by the following permutation formula:

$$\text{subcarrier}(k,s,m) = ((\text{floor}(k/L) + s + m \cdot U) \bmod N) \cdot U + (Pt[(k+m \cdot \text{PermBase}) \bmod U] + \text{Cell\_ID}) \bmod U$$

where the terms have the meanings described above in paragraph [0022]. The floor function may be a dividing function with rounding down; for example, 8 floor 3 may equal 2.

In an example embodiment, the base station 104 may determine whether to apply the permutation formula described in paragraph [0022] or paragraph [0024] based on comparing N to U, and then apply the permutation formula based on the determining.

Figure 4:
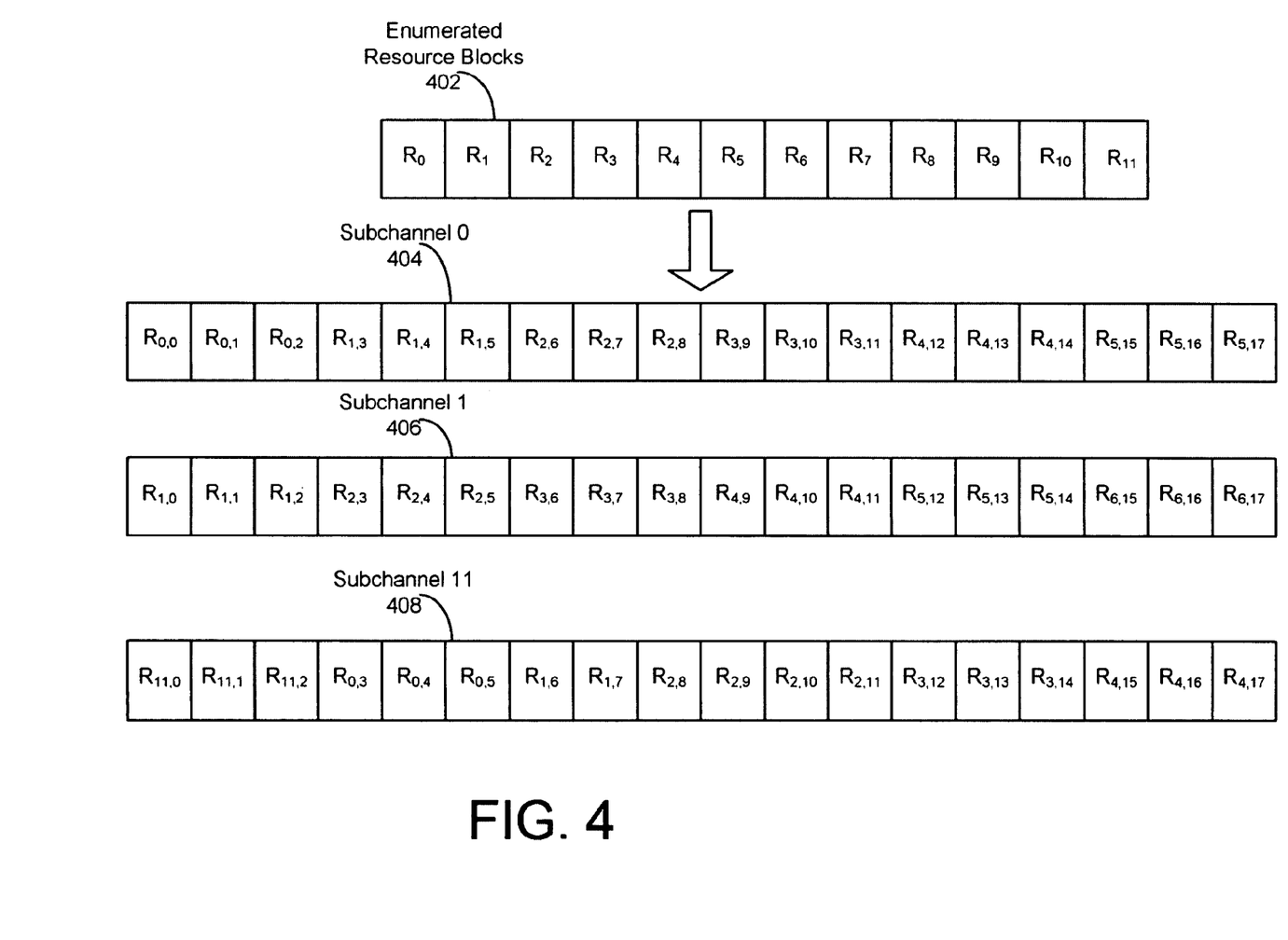
FIG. 4 is a block diagram showing assignment of subcarriers from resource blocks to subchannels according to an example embodiment.

FIG. 4 is a block diagram showing assignment of subcarriers from resource blocks 402 to subchannels 404, 406, 408 according to an example embodiment. In this example, N may be less than U, and the subcarriers may be mapped to the subchannels 404, 406, 408 as described in paragraph [0024].

In an example embodiment, a permutation sequence, such as $P_0, P_1, P_2, P_3, P_4, P_5, P_6, P_7, P_8, P_9, P_{10}, P_{11}, P_{12}, P_{13}, P_{14}, P_{15}, P_{16}, P_{17}$ of length 18, used for the above permutation formulas, may be constructed for full or partial usage of subchannels by using Reed-Solomon Coding. In an example in which N>=U, for example, N=24 and U=18, subchannels may be defined according to either of the above permutation formulas. The $j^{th}$ subcarrier (per OFDMA symbol) may be denoted in the $i^{th}$ resource block as (i,j). i may range from 0 to 23, for example; j may range from 0 to 17, for example. In this example, the resource mapping for the subchannels may be:

For the first OFDM symbol:
subchannel 0 contains: $(0, P_0) (1, P_1) (2, P_2) \ldots (17, P_{17})$
subchannel 1 contains: $(1, P_0) (2, P_1) (3, P_2) \ldots (18, P_{17})$
. . .
subchannel 23 contains: $(23, P_0) (0, P_1) (1, P_2) \ldots (16, P_{17})$
For the second OFDM symbol:
subchannel 0 contains: $(18, P_0) (19, P_1) (20, P_2) \ldots (11, P_{17})$
subchannel 1 contains: $(19, P_0) (20, P_1) (21, P_2) \ldots (12, P_{17})$
. . .
subchannel 23 contains: $(17, P_0) (18, P_1) (19, P_2) \ldots (10, P_{17})$
For the fourth OFDM symbol:
subchannel 0 contains: $(6, P_0) (7, P_1) (8, P_2) \ldots (23, P_{17})$
subchannel 1 contains: $(7, P_0) (8, P_1) (9, P_2) \ldots (0, P_{17})$
. . .
subchannel 23 contains: $(5, P_0) (6, P_1) (7, P_2) \ldots (22, P_{17})$
For the sixth OFDM symbol:
subchannel 0 contains: $(18, P_0) (19, P_1) (20, P_2) \ldots (11, P_{17})$
subchannel 1 contains: $(19, P_0) (20, P_1) (21, P_2) \ldots (12, P_{17})$
. . .
subchannel 23 contains: $(17, P_0) (18, P_1) (19, P_2) \ldots (10, P_{17})$
OFDM symbols not shown above may be mapped in a similar manner.

For the case N<U, for example, N=12 and U=18, multiple tones (for example, 3 tones) may be chosen from one resource block each time and mapped to a subchannel. In this example, the resource mapping for the subchannels may be:

For the first OFDM symbol:
subchannel 0 contains: $(0, P_0) (0, P_1) (0, P_2) \ldots (5, P_{15}) (5, P_{16}) (5, P_{17})$
subchannel 1 contains: $(1, P_0) (1, P_1) (1, P_2) \ldots (6, P_{15}) (6, P_{16}) (6, P_{17})$
. . .
subchannel 11 contains: $(11, P_0) (11, P_1) (11, P_2) \ldots (4, P_{15}) (4, P_{16}) (4, P_{17})$
For the second OFDM symbol:
subchannel 0 contains: $(6, P_0) (6, P_1) (6, P_2) \ldots (11, P_{15}) (11, P_{16}) (11, P_{17})$
subchannel 1 contains: $(7, P_0) (7, P_1) (7, P_2) \ldots (0, P_{15}) (0, P_{16}) (0, P_{17})$
. . .
subchannel 11 contains: $(5, P_0) (5, P_1) (5, P_2) \ldots (10, P_{15}) (10, P_{16}) (10, P_{17})$ Further OFDM symbols may be mapped in a similar manner.

In an example embodiment, resource blocks may be mapped into subchannels dynamically for any number of resource blocks 200. For example, if the base station 104 receives a new allocation of resource blocks 200 for the wireless network 100 and/or one or more sectors 112, 114, 116, the base station 104 may determine the new number of available resource blocks, and may map the new resource blocks into a new group of subchannels. The base station 104 may thereby map resource blocks 200 to subchannels in an environment with varying allocations of spectral resources, according to an example embodiment.

Figure 5:
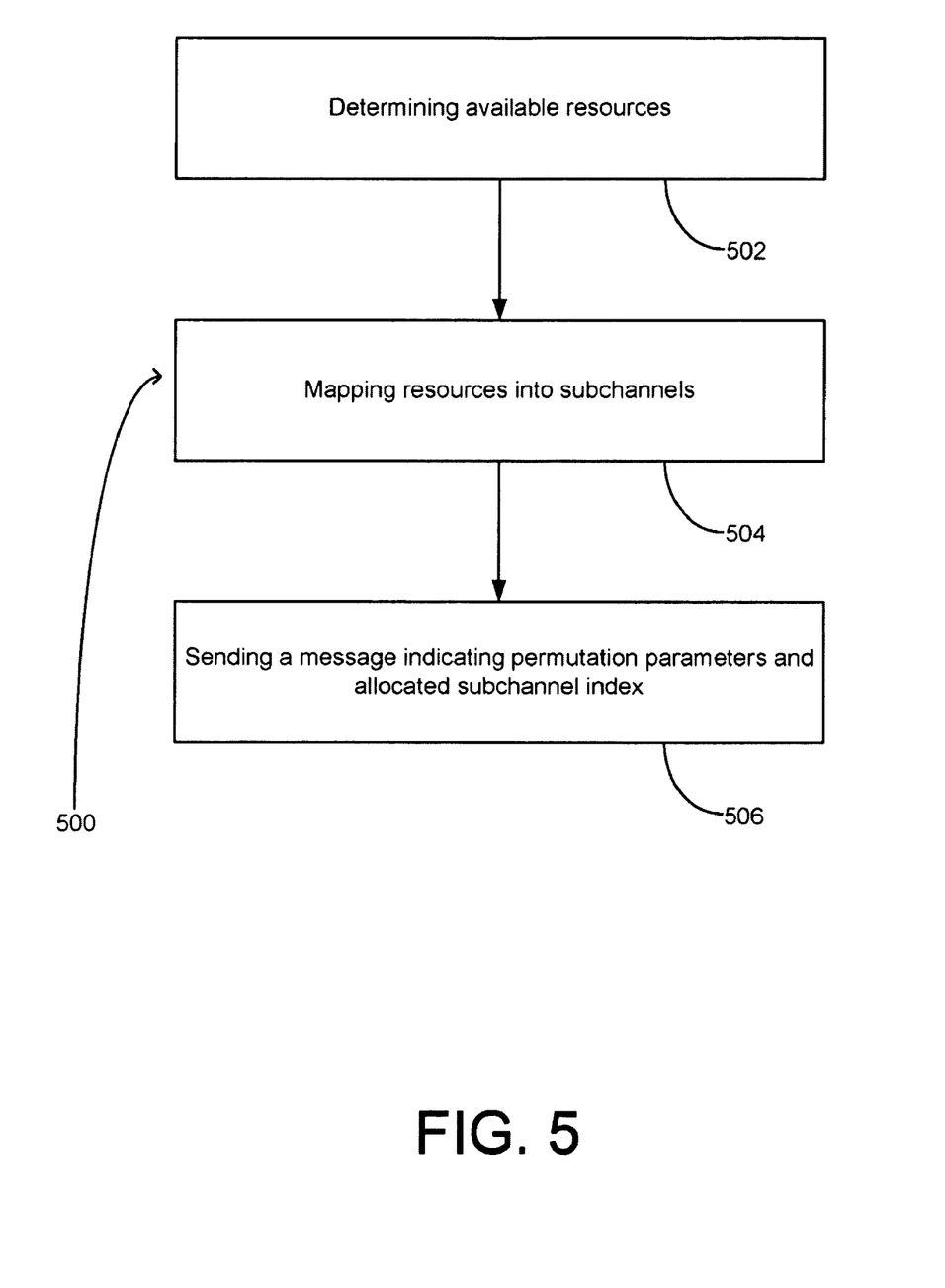
FIG. 5 is a flowchart showing a method according to an example embodiment.

FIG. 5 is a flowchart showing a method according to an example embodiment. In this example, the method 500 may include determining available resources (502), mapping resources into subchannels (504), and sending a message indicating an allocated subchannel index and permutation parameters (506).

According to an example embodiment, the determining may include determining, by a first wireless node (which may include a base station 104) in a wireless network, a number N of resource blocks available for transmitting data within a cell, the N resource blocks each including V resource block orthogonal frequency division multiplexing (OFDM) symbols, the V resource block OFDM symbols each including U resource block subcarriers. The cell may include the wireless network or a sector within the wireless network.

In an example embodiment, the mapping may include mapping the N resource blocks into N subchannels based on a permutation formula, the permutation formula assigning, based on permutation parameters including the number N and a random or pseudorandom variable, U subchannel subcarriers for each of V subchannel OFDM symbols to each of the N subchannels. The mapping may thereby allocate a subchannel index for each of the N subchannels.

In an example embodiment, the sending may include sending a message to a second wireless node (which may include a mobile station 106, 108, 110) indicating the permutation parameters N and the random or pseudorandom variable, and the allocated subchannel index, of at least one of the N subchannels for communication between the first wireless node and the second wireless node. Based on receiving this message, the second wireless node may then know the mapping of physical subcarriers or tones in the allocated subchannel by using the same permutation formula as described above. The second wireless node may be able to apply the permutation parameters to the permutation formula based on known parameters, such as parameters determined by a standard. In an example embodiment, the permutation parameters may also include the cell ID (or wireless network ID or sector ID), and the message may also include the cell ID.

In an example embodiment, the method 500 may further include sending data from the first wireless node to the second wireless node via at least one of the N subchannels.

In an example embodiment the mapping resource into subchannels may include mapping the N resource blocks into the N subchannels based on the permutation formula, the permutation formula assigning, based on the number N and a random or pseudorandom integer, the U subchannel subcarriers for each of the V subchannel OFDM symbols to each of the N subchannels.

In an example embodiment, the permutation formula may be:

$$\text{subcarrier}(k,s,m)=((k+s+m\cdot U)\bmod N)\cdot U+(Pt[(k+m\cdot \text{PermBase})\bmod U]+\text{Cell\_ID})\bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is an identifier of the cell; and
PermBase is the random or pseudorandom variable.

In an example embodiment, the permutation formula may be:

$$\text{subcarrier}(k,s,m)=((\text{floor}(k/L)+s+m\cdot U)\bmod N)\cdot U+(Pt[(k+m\cdot \text{PermBase})\bmod U]+\text{Cell\_ID})\bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is an identifier of the cell; and
PermBase is the random or pseudorandom variable.

In an example embodiment, the determining may include determining, by a base station in an IEEE 802.16 Worldwide Interoperability Microwave Access (WiMAX) network, the number N of resource blocks available for transmitting data within the cell, the N resource blocks each including the V resource block (OFDM) symbols, the V resource block OFDM symbols each including the U resource block subcarriers. In this example, sending the message may include sending the message to a WiMAX mobile station indicating the permutation parameters N and the random or pseudorandom number and allocated subchannel index of the at least one of the subchannels for communication between the base station and the mobile station, and the mobile station may then know the mapping of physical subcarriers or tones in the allocated subchannel by using either of the permutation formulas described above.

In an example embodiment, V may equal 6 OFDM symbols for including in each resource block and subchannel and U may equal 18 subcarriers included in each OFDM symbol.

In an example embodiment, each subcarrier may have a bandwidth of approximately ten kilohertz (10 kHz).

In an example embodiment, the method 500 may further include determining, by the first wireless node, a new number NN of resource blocks available for transmitting data within the cell, the NN resource blocks each including V resource block OFDM symbols, the V resource block OFDM symbols each including U resource block subcarriers. In this example, the method 500 may further include mapping the NN resource blocks into NN subchannels based on the permutation formula, the permutation formula assigning, based on the number NN and a new random or pseudorandom variable, U subchannel subcarriers for each of V subchannel OFDM symbols to each of the NN subchannels. In this example, the method 500 may further include sending an updated message to the second wireless node indicating updated permutation parameters NN and the random or pseudorandom number and the allocated subchannel index of at least one of the NN subchannels for communication between the first wireless node and the second wireless node.

Figure 6:
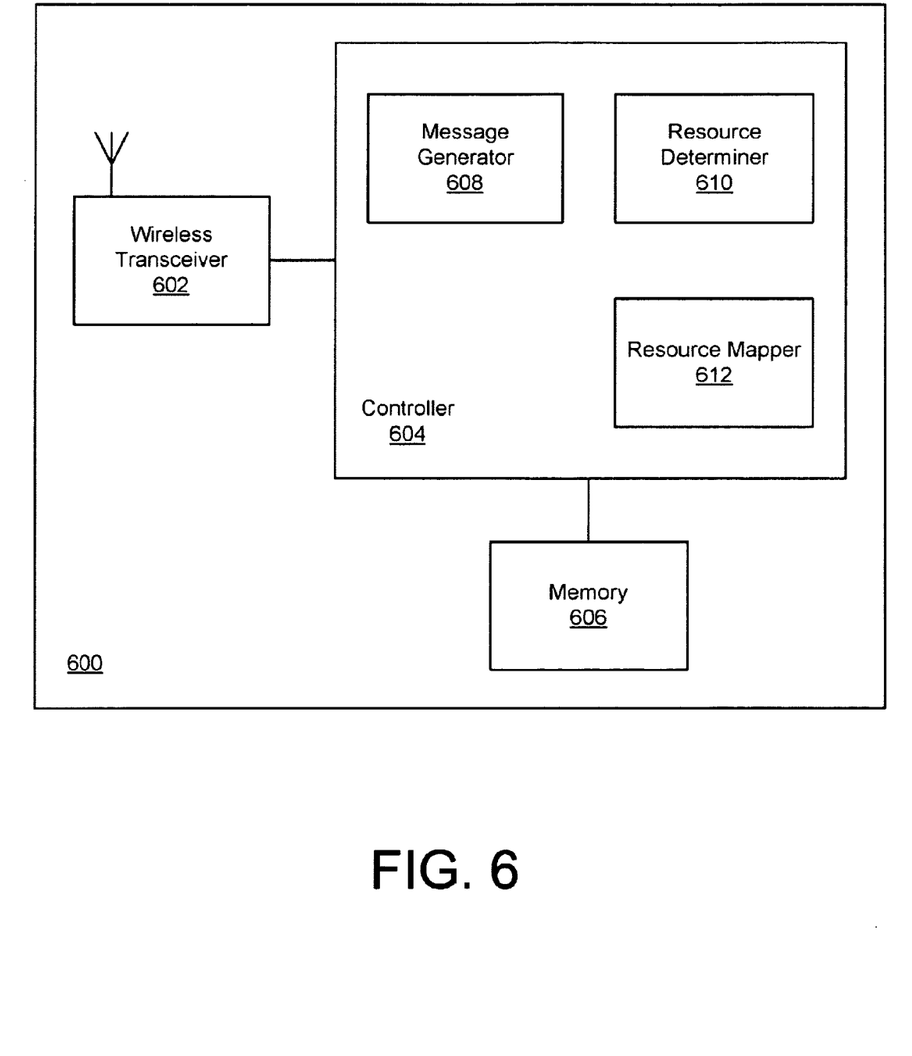
FIG. 6 is a block diagram of a wireless node according to an example embodiment.

FIG. 6 is a block diagram of a wireless node 600 according to an example embodiment. In this example, the wireless station 600, which may include, for example, a base station 104 or mobile station 106, 108, 110, may include a wireless transceiver 602, a controller 604, and a memory 606. In an example embodiment, the transceiver 602 may be configured to send messages to other wireless nodes indicating the permutation parameters and the allocated subchannel index of at least one of N subchannels for communication between the wireless node 602 and other wireless nodes. The transceiver 602 may also be configured to send data from the wireless node 602 to other wireless nodes via at least one of the N subchannels. The transceiver 602 may, for example, send the message indicating the permutation parameters and allocated subchannel index from the wireless node 600, the wireless node 600 including a WiMAX base station, to another wireless node, the other wireless node including a WiMAX mobile station.

The controller 604 may include a resource determiner 610 configured to determine the number of resource blocks available for transmitting data, as described above. The controller 604 may also include a resource mapper 612 configured to map the resource blocks into subchannels based on a permutation formula, as described above. The controller 604 may also include a message generator 608 configured to generate messages indicating the allocated subchannel index, and/or to send data.

The wireless node 600 may also include a memory 608. The memory 608 may be configured to store data. For example, the memory 608 may be configured to store the available resources, the mapping, and/or data to be transmitted.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method comprising:
   determining, by a first wireless node in a wireless network, a number N of resource blocks available for transmitting data within a cell, the N resource blocks each including a number V of resource block orthogonal frequency division multiplexing (OFDM) symbols, the V resource block OFDM symbols each including a number U of resource block subcarriers;
   mapping the N resource blocks into N subchannels based on a permutation formula, the permutation formula assigning, based on permutation parameters including the number N, a random or pseudorandom variable, and an identifier of the cell, U subchannel subcarriers for each of V subchannel OFDM symbols to each of the N subchannels and thereby allocating a subchannel index for each of the N subchannels; and
   sending a message to a second wireless node indicating the permutation parameters N and the random or pseudorandom variable, and the allocated subchannel index of at least one of the N subchannels for communication between the first wireless node and the second wireless node.

2. The method of claim 1, further comprising sending data from the first wireless node to the second wireless node via at least one of the N subchannels.

3. The method of claim 1, wherein the mapping the N resource blocks into the N subchannels includes mapping the N resource blocks into the N subchannels based on the permutation formula, the permutation formula assigning, based on the permutation parameters including the number N, a random or pseudorandom integer, and the identifier of the cell, the U subchannel subcarriers for each of the V subchannel OFDM symbols to each of the N subchannels and thereby allocating the subchannel index for each of the N subchannels.

4. The method of claim 1, wherein the permutation formula is:

$$\text{subcarrier}(k,s,m) = ((k+s+m \cdot U) \bmod N) \cdot U + (Pt[(k+m \cdot \text{PermBase}) \bmod U] + \text{Cell\_ID}) \bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

5. The method of claim 1, wherein the permutation formula is:

$$\text{subcarrier}(k,s,m) = ((\text{floor}(k/L) + s + m \cdot U) \bmod N) \cdot U + (Pt[(k+m \cdot \text{PermBase}) \bmod U] + \text{Cell\_ID}) \bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

6. The method of claim 1 wherein:
the determining includes determining, by a base station in an IEEE 802.16 Worldwide Interoperability Microwave Access (WiMAX) network, the number N of resource blocks available for transmitting data within the cell, the N resource blocks each including the V resource block (OFDM) symbols, the V resource block OFDM symbols each including the U resource block subcarriers; and
sending the message includes sending the message to a WiMAX mobile station indicating the permutation parameters and allocated subchannel index of the at least one of the subchannels for communication between the base station and the mobile station.

7. The method of claim 1, wherein V=6 OFDM symbols are included in each resource block and subchannel and U=18 subcarriers are included in each OFDM symbol.

8. The method of claim 1, wherein each subcarrier has a bandwidth of approximately ten kilohertz (10 kHz).

9. The method of claim 1, further comprising:
determining, by the first wireless node, a new number NN of resource blocks available for transmitting data within the cell, the NN resource blocks each including V resource block OFDM symbols, the V resource block OFDM symbols each including U resource block subcarriers;
mapping the NN resource blocks into NN subchannels based on the permutation formula, the permutation formula assigning, based on the number NN, a new random or pseudorandom variable, and the identifier of the cell U subchannel subcarriers for each of V subchannel OFDM symbols to each of the NN subchannels; and
sending an updated message to the second wireless node indicating updated permutation parameters and the allocated subchannel index of at least one of the NN subchannels for communication between the first wireless node and the second wireless node.

10. An apparatus comprising:
a controller configured to:
determine a number N of resource blocks available for transmitting data within a cell, the N resource blocks each including a number V of resource block orthogonal frequency division multiplexing (OFDM) symbols, the V resource block OFDM symbols each including a number U of resource block subcarriers;
map the N resource blocks into N subchannels based on a permutation formula, the permutation formula assigning, based on permutation parameters including the number N, a random or pseudorandom variable, and an identifier of the cell, U subchannel subcarriers for each of V subchannel OFDM symbols to each of the N subchannels and thereby allocating a subchannel index for each of the N subchannels; and
generate a message for a receiving wireless node indicating the permutation parameters N and the random or pseudorandom variable and the allocated subchannel index of at least one of the N subchannels for communication between the first wireless node and the second wireless node; and
a wireless transmitter coupled to the controller, the wireless transmitter being configured to wirelessly transmit the message to the receiving wireless node.

11. The apparatus of claim 10, wherein:
the controller is further configured to generate data for transmission from the apparatus to the receiving wireless node via at least one of the N subchannels; and
the wireless transceiver is further configured to wirelessly transmit the data from the apparatus to the receiving wireless node via at least one of the N subchannels.

12. The apparatus of claim 10, wherein the permutation formula is:

$$\text{subcarrier}(k,s,m) = ((k+s+m \cdot U) \bmod N) \cdot U + (Pt[(k+m \cdot \text{PermBase}) \bmod U] + \text{Cell\_ID}) \bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

13. The apparatus of claim 10, wherein the permutation formula is:

$$\text{subcarrier}(k,s,m) = ((\text{floor}(k/L) + s + m \cdot U) \bmod N) \cdot U + (Pt[(k+m \cdot \text{PermBase}) \bmod U] + \text{Cell\_ID}) \bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

14. The apparatus of claim 10 wherein the apparatus includes a base station in an IEEE 802.16 Worldwide Interoperability Microwave Access (WiMAX) network.

15. The apparatus of claim 10, wherein V=6 OFDM symbols are included in each resource block and subchannel and U=18 subcarriers are included in each OFDM symbol.

16. The apparatus of claim 10, wherein each subcarrier has a bandwidth of approximately ten kilohertz (10 kHz).

17. The apparatus of claim 10, wherein:
the controller is further configured to:
determine a new number NN of resource blocks available for transmitting data within the cell, the NN resource blocks each including V resource block OFDM symbols, the V resource block OFDM symbols each including U resource block subcarriers;
map the NN resource blocks into NN subchannels based on the permutation formula, the permutation formula assigning, based on the number NN, a new random or pseudorandom variable, and the identifier of the cell, U subchannel subcarriers for each of V subchannel OFDM symbols to each of the NN subchannels; and
send an updated message to the receiving wireless node indicating updated permutation parameters and the allocated subchannel index of at least one of the NN subchannels for communication between the apparatus node and the receiving wireless node; and
the wireless transmitter is further configured to wirelessly transmit the message to the receiving wireless node.

18. A computer program product for mapping resource blocks into subchannels, the computer program product being tangibly embodied on a non-transitory computer-readable medium and including executable code that, when executed, is configured to cause a base station which wirelessly communicates with a plurality of mobile stations to:
determine, by the base station, a number N of resource blocks available for transmitting data within a cell, the N resource blocks each including a number V of resource block orthogonal frequency division multiplexing (OFDM) symbols, the V resource block OFDM symbols each including a number U of resource block subcarriers;
map the N resource blocks into N subchannels based on a permutation formula, the permutation formula assigning, based on permutation parameters including the number N, a random or pseudorandom variable, and an identifier of the cell, U subchannel subcarriers for each of V subchannel OFDM symbols to each of the N subchannels and thereby allocating a subchannel index for each of the N subchannels; and
send a message to at least one of the plurality of mobile stations indicating the permutation parameters N and the random or pseudorandom variable and the allocated subchannel index of at least one of the N subchannels for communication between the base station and the at least one of the plurality of mobile stations.

19. The computer program product of claim 18, further configured to cause the base station to send data from the base station to the at least one of the plurality of mobile stations via at least one of the N subchannels.

20. The computer program product of claim 18, wherein the permutation formula is:

$$\text{subcarrier}(k,s,m)=((k+s+m\cdot U)\bmod N)\cdot U+(Pt[(k+m\cdot \text{PermBase})\bmod U]+\text{Cell\_ID})\bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

21. The computer program product of claim 18, wherein the permutation formula is:

$$\text{subcarrier}(k,s,m)=((\text{floor}(k/L)+s+m\cdot U)\bmod N)\cdot U+(Pt[(k+m\cdot \text{PermBase})\bmod U]+\text{Cell\_ID})\bmod U$$

where subcarrier(k,s,m) is a physical subcarrier index of an $m^{th}$ OFDM symbol;
s is a subchannel index ranging from 0 to N−1;
k is a tone index ranging from 0 to U−1 in subchannel s in the $m^{th}$ OFDM symbol;
m is an OFDM symbol index ranging from 0 to V−1 in subchannel s;
Pt is a permutation sequence of length U;
Cell_ID is the identifier of the cell; and
PermBase is the random or pseudorandom variable.

22. The computer program product of claim 18 wherein:
the determining includes determining, by the base station in an IEEE 802.16 Worldwide Interoperability Microwave Access (WiMAX) network, the number N of resource blocks available for transmitting data within the cell, the N resource blocks each including the V resource block (OFDM) symbols, the V resource block OFDM symbols each including the U resource block subcarriers; and
sending the message includes sending the message to the at least one of the plurality of mobile stations including a WiMAX mobile station, the message indicating the permutation parameters and allocated subchannel index of the at least one of the subchannels for communication between the base station and the WiMAX mobile station.

23. The computer program product of claim 18, wherein V=6 OFDM symbols for included in each resource block and subchannel and U=18 subcarriers included in each OFDM symbol.

24. The computer program product of claim 18, wherein each subcarrier has a bandwidth of approximately ten kilohertz (10 kHz).

25. The computer program product of claim 18, further configured to cause the base station to:
determine a new number NN of resource blocks available for transmitting data within the cell, the NN resource blocks each including V resource block OFDM symbols, the V resource block OFDM symbols each including U resource block subcarriers;
map the NN resource blocks into NN subchannels based on the permutation formula, the permutation formula assigning, based on the number NN, a new random or pseudorandom variable, and the identifier of the cell, U subchannel subcarriers for each of V subchannel OFDM symbols to each of the NN subchannels; and
send an updated message to the at least one of the plurality of mobile stations indicating updated permutation parameters and the allocated subchannel index of at least one of the NN subchannels for communication between the base station and the at least one of the plurality of mobile stations.

* * * * *